United States Patent [19]

Bahn

[11] Patent Number: 5,313,149

[45] Date of Patent: May 17, 1994

[54] CURRENT SUPPLY CONTROL APPARATUS FOR INDUCTANCE LOAD

[75] Inventor: Itsuki Bahn, Tokyo, Japan

[73] Assignee: Kabushikigaisha Sekogiken, Tokyo, Japan

[21] Appl. No.: 910,150

[22] PCT Filed: Nov. 22, 1991

[86] PCT No.: PCT/JP91/01605

§ 371 Date: Jul. 20, 1992

§ 102(e) Date: Jul. 20, 1992

[87] PCT Pub. No.: WO92/10025

PCT Pub. Date: Jun. 11, 1992

[30] Foreign Application Priority Data

Nov. 22, 1990 [JP] Japan .................. 2-316063
Nov. 22, 1990 [JP] Japan .................. 2-317676

[51] Int. Cl.$^5$ ............................ H02P 1/24
[52] U.S. Cl. .................... 318/727; 318/685; 318/437; 318/71
[58] Field of Search ............ 318/727, 737, 685, 71

[56] References Cited

U.S. PATENT DOCUMENTS

| | | | |
|---|---|---|---|
| 4,506,207 | 3/1985 | Ferrari | 318/696 |
| 4,896,088 | 1/1990 | Jahns | 318/696 |
| 4,933,620 | 6/1990 | MacMinn et al. | 318/696 |
| 4,933,621 | 6/1990 | MacMinn et al. | 318/696 |
| 4,959,601 | 9/1990 | Kikugawa | 318/696 |
| 5,012,171 | 4/1991 | Sember | 318/696 |
| 5,208,524 | 5/1993 | Kono et al. | 318/727 |

OTHER PUBLICATIONS

Le-Huy, H. et al., "A Novel Unipolar Converter for Switched Reluctance Motor", PESC '89 RECORDQ, vol. 1, Jun. 29, 1989, Milwaukee, Wis., pp. 3-10.

Primary Examiner—William M. Shoop, Jr.
Assistant Examiner—Karen Masih
Attorney, Agent, or Firm—Staas & Halsey

[57] ABSTRACT

The present invention relates to a current supply control apparatus capable of actuating a large inductance load at a low electric power source voltage and also capable of improving a responsibility in a current supply control of the inductance load. When a detecting voltage of an absolute value circuit (10) representing a current value flowing in an exiting coil (1), provided as an inductance load, exceeds a standard voltage, transistors (3a, 3b) interposed between a DC electric power source (2a, 2b) and the exciting coil are turned off, and a magnetic energy stored in the exciting coil is utilized to charge a capacitor (5) up to a high voltage so that a current flowing after the transistors have been turned off is quickly reduced. Furthermore, when the detecting voltage decreases down to a predetermined value, the transistors are turned on, and then both a voltage charged in the capacitor and a voltage of the DC electric power source are applied to the exciting coil to cause the exciting current to be sharply increased. With this arrangement, the exciting current can be made to respond sharply to the standard voltage without specially applying a high voltage from the DC electric power source to the inductance load.

5 Claims, 8 Drawing Sheets ively large.

CURRENT SUPPLY CONTROL APPARATUS FOR INDUCTANCE LOAD

TECHNICAL FIELD

The present invention relates to a current supply control apparatus for an inductance load such as a magnetic bearing, a reluctance type motor, a stepping motor etc., more particularly to a current supply control apparatus capable of actuating a large inductance load without using a high voltage electrical power source, thereby improving a responsibility in a current supply control for an inductance load.

BACKGROUND ART

Conventionally, in the case where a large inductance load has to be actuated, a current supply control circuit is interposed between the inductance load and a high-voltage electrical power source so that an application of high voltage can be controlled by the current supply control circuit. For example, in order to realize a magnetic levitation of a rotor member in a magnetic bearing (i.e. a linear motor) using an electromagnet associated with a large inductance exciting coil, a high voltage is applied to the exciting coil so as to steeply build up an exciting current.

Furthermore, in a reluctance type motor with an exciting coil having a fairly large inductance for its armature, a voltage 5~10 times as large as a normal voltage for obtaining a normal motor output torque is applied to a current supply circuit during a building-up period of an exciting current in order to promptly build up the exciting current for preventing the motor output torque from being undesirably reduced. Also, a magnetic energy stored in the exciting coil is returned to an electric power source during a trailing-edge period of the exciting current, thereby quickly decreasing the exciting current to prevent a counter torque from being generated.

However, a voltage required for realizing a magnetic levitation of a rotor member in a magnetic bearing or a voltage applied to an exciting coil of a reluctance motor for building up an exciting coil are so large that a voltage of the electric power source becomes excessively large.

Furthermore, if an applied voltage to a reluctance motor is not sufficient, a building-up and a trailing-edge of an exciting current become so dull that not only a torque reduction appears in its building-up period but a counter-torque occurs in its trailing-edge period. This means that the motor cannot be driven at a high speed.

For example, in the case where a conventional reluctance type motor is driven by a battery as a driving source of an automotive vehicle, the rotational speed of the motor cannot be increased more than several hundreds rpm. Thus, the motor will not have any practical use. A stepping motor also has similar problems.

SUMMARY OF INVENTION

The purpose of the present invention is to provide a current supply control apparatus capable of actuating a large inductance load without using a high-voltage electric power source and also capable of improving a responsibility in a current supply control for an inductance load.

In order accomplish above purposes, the present invention provides a current supply control apparatus for an inductance load comprising: a first and a second switching elements interposed between a DC electric power source and said inductance load; a first and a second diodes inversely connected to respective connecting units each consisting of corresponding one of said first and second switching elements and an inductance load; a current detecting circuit for generating a detecting voltage representing a current flowing in said inductance load; a back-flow preventing diode connected in a forward direction with respect to the DC electric power source on the DC electric power source side; a capacitor connected to said back-flow preventing diode; and a chopper circuit for comparing said detecting voltage of the current detecting circuit with a standard voltage being variably set in a voltage waveform so as to turn on or off said first and second switching elements depending on the result of comparison.

Whereby, when the detecting voltage exceeds the standard voltage, the first and second switching elements are turned off; during this turning-off period of the switching element, a magnetic energy stored in the inductance load is prevented from being returned to the DC electric power source by said back-flow preventing diode; the magnetic energy is supplied through said first and second diodes to the capacitor to charge it up with a high voltage, thereby causing a current flowing in the inductance load after the switching element has been turned off is quickly reduced; and when the detecting voltage decreases down to a predetermined value, the first and second switching elements are turned on to cause a high voltage equal to a sum of the voltage charged in the capacitor and a voltage of the DC electric power source to be applied to the inductance load so that a current flowing in the inductance load can be built up sharply.

Preferably, the current supply control apparatus further comprises a charging inductance, a third switching element interposed between said back-flow preventing diode and said charging inductance, and a third diode interposed between said charging inductance and the capacitor, wherein a magnetic energy stored in the charging inductance is supplied to the capacitor through the third diode, when the third switching element is turned off.

As described above, in accordance with the present invention, when the detecting voltage representing the current flowing in the inductance load exceeds the standard voltage, the first and second switching elements interposed between the DC electric power source and the inductance load are turned off. Simultaneously, the capacitor is charged up with a high voltage by virtue of the magnetic energy stored in the inductance load. Thus, the current flowing in the inductance load after the switching element has been turned off is quickly reduced.

When the detecting voltage has decreased down to the predetermined value, the first and second switching elements are turned on. Thus, the high voltage equal to the sum of the voltage charged in the capacitor and the voltage of the DC electric power source is applied to the inductance load, causing the current flowing in the inductance load to be increased sharply.

Accordingly, storage and discharge of the magnetic energy can be promptly carried out without applying a higher voltage from the DC electric power source to the inductance load for quick rise and fall of exciting current. That is, responsibility of the exciting current with respect to the standard voltage can be improved.

Preferably, when the third switching element interposed between the back-flow preventing diode and a charging inductance is turned off, the magnetic energy stored in the charging inductance is supplied to the capacitor through the third diode. As a result, the responsibility of the exciting current control can be further improved.

BEST MODE FOR CARRYING OUT THE INVENTION

Hereinafter, a current supply control apparatus in accordance with a first embodiment of the present invention will be explained.

Figure 1:
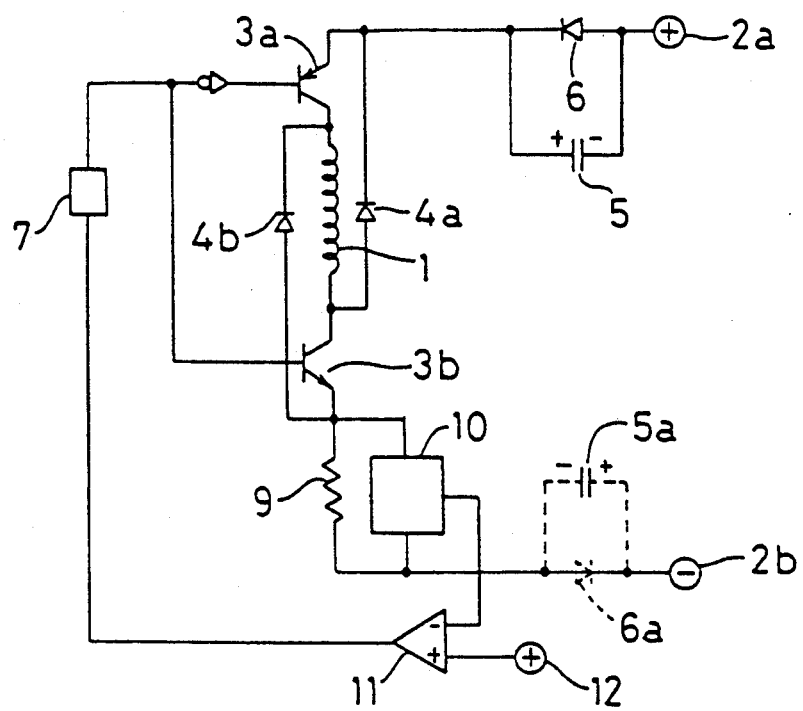
FIG. 1 is a circuit diagram showing a current supply control apparatus in accordance with a first embodiment of the present invention applied to a magnetic bearing.

This current supply control apparatus serves to control an exciting current supplied to an exciting coil for a magnetic bearing as an inductance load. As shown in FIG. 1, the current supply control apparatus comprises a transistor 3a interposed between a positive output terminal 2a of a DC electric power source and one end of an exciting coil 1, and a transistor 3b interposed between a negative output terminal 2b of the DC electric power source and the other end of the exciting coil 1. A magnetic core of the exciting coil 1 is omitted in FIG. 1. A diode 4a is inversely connected to a serial connecting unit consisting of the transistor 3a and the exciting coil 1. A diode 4b is inversely connected to a serially connected unit consisting of the transistor 3b and the exciting coil 1.

A back-flow preventing diode 6 is interposed between the positive output terminal 2a of the DC electric power source and the transistor 3a so as to be connected in a forward direction with respect to the DC electric power source, whereas a capacitor 5 having a small capacitance is connected in parallel with the diode 6.

Furthermore, a resistance 0 for detecting a current flowing through the exciting coil 1 is interposed between the transistor 3b and the negative output terminal 2b of the DC electric power source, whereas an absolute value circuit 10 consisting of a rectification circuit 10 is connected between both ends of the resistance 9 for detecting a voltage drop in the resistance 9 provided for indicating the resistance 9.

An output terminal of the absolute value circuit 10 is connected to a negative input terminal of an operational amplifier 11, whereas a positive input terminal of the operational amplifier 11 is connected to a standard voltage input terminal 12. An output terminal of the operational amplifier 11 is connected to an input terminal of an amplification circuit 7. Further, an output terminal of the amplification circuit 7 is not only connected to a base of the transistor 3b but also connected to a base of the transistor 3a through an inversion circuit.

Figure 2:
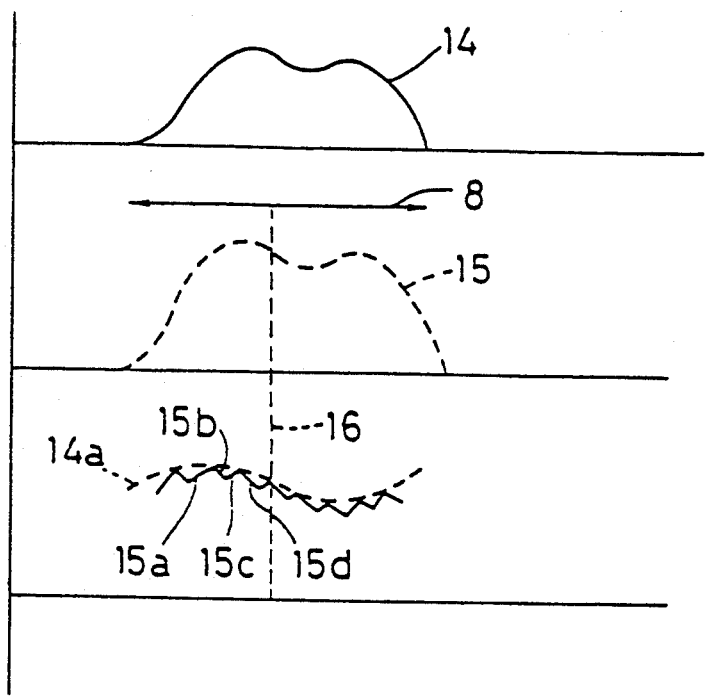
FIG. 2 is a graph showing a standard voltage applied to the apparatus of FIG. 1 and an exciting current flowing in an exciting coil of the magnetic bearing, together with an enlarged view of the exciting current versus time.

In the current supply control circuit constituted as above, a standard voltage 14 shown in FIG. 2 is applied to the standard voltage input terminal 12 of the current supply control circuit. In accordance with an application of the standard voltage 14, an H-level output sent out from the operational amplifier 11 is amplified in the amplification circuit 7 and, in turn, supplied to the transistor 3a through the inversion circuit and directly the transistor 3b, thereby effecting the continuity between both transistors 3a and 3b.

As a result, the DC electric power source voltage is supplied to the exciting coil 1 through the diode 6, both transistors 3a and 3b and the resistance 9. When the exciting coil is supplied with current, the exciting current builds up as shown by a broken line 15 in FIG. 2.

Subsequently, if the exciting current increases until an output of the absolute value circuit 10 exceeds the standard voltage 14 applied to the positive input terminal of the operational amplifier 11, an output of the operational amplifier 11 changes from an H-level to an L-level to turn off the transistors 3a and 3b.

In this instance, the back-flow preventing diode 6 prevents a large magnetic energy stored in the exciting coil 1 from returning to the DC electric power source through the diodes 4a and 4b. On the other hand, the stored magnetic energy flows into the capacitor 5 to charge it up to a high voltage with polarities shown in the drawing. That is, the magnetic energy of the exciting coil 1 is converted to the electrostatic energy of the capacitor 5. Thus, the exciting current decreases steeply.

When the exciting current decreases down to a predetermined value defined from a hysteresis characteristics of the operational amplifier 11, the output of the operational amplifier 11 returns to an H-level to turn on the transistors 3a and 3b. In this instance, a higher voltage equal to the sum of a charged voltage of the capacitor and a voltage of the DC electric power source is applied to the exciting coil 1 to sharply build up the exciting current.

Subsequently, the exciting current will be further increased by the DC electric power source voltage. When the exciting current increases up to a value corresponding to the standard voltage 14, the output of the operational amplifier changes to an L-level to turn off the transistors 3a and 3b. In this manner, the exciting current is chopper-controlled by a chopper circuit consisting of the amplifier circuit 7, the resistance 9, the absolute value circuit 10, and the operational amplifier 11, whereby the exciting current is caused to change along a curve 15 which is proportional to the standard voltage 14.

Next, the chopper control is further explained with reference to FIG. 2 showing an enlarged view of the exciting current versus time in a vicinity of time point at which the circuit is energized, which is denoted by a broken line 16.

When the transistors 3a and 3b are turned on, a high-voltage due to an electrostatic energy stored in the capacitor 5 is applied to the exciting coil 1, causing the exciting coil 1 to build up promptly as shown by a curve 15a of FIG. 2. In this case, a joule loss occurring due to a resistance of the exciting coil 1 will be compensated by the DC electric power source at a last stage of the building-up period of the exciting current.

When the exciting current reaches the curve 14a, which changes correspondingly with the standard voltage 14, the transistors 3a and 3b are turned off, and this causes the magnetic energy stored in the exciting coil 1 to be supplied to the capacitor 5 to decrease the exciting current steeply as shown by a curve 15b.

By repeating above cycle, the exciting current changes against its upper limit of the curve 14a, as shown by ripple curves 15a~15d in FIG. 2. As can be guessed from the fact that the exciting coil 1 and the capacitor 5 have an electric characteristic similar to a parallel resonance circuit in such a manner that a resonance frequency of the exciting coil 1 and the capacitor 5 increases as the capacitance of the capacitor 5 becomes small, a time width of respective exciting current sections 15a~15d is determined based on the capacitance of the capacitor 5, and thus it becomes small as the capacitance becomes small.

In the case of with a conventional apparatus which applies a high DC voltage from the electric power source in order to facilitate the storage and discharge of magnetic energy, there was a limitation in reducing the time width of respective exciting current sections 15a~15d. That is, there was a limitation in increasing a chopper frequency. Accordingly, when the time width (shown by an arrow 8 in FIG. 2) of the standard voltage 14 is decreased down to approximately 100 μsec, the responsibility of exciting current to the standard voltage change will be deteriorated substantially.

On the contrary, according to this embodiment, a good responsibility can be maintained even in a high chopper frequency by using a small capacitance capacitor 5. Furthermore, it is not required to specially use a high voltage and, therefore, a usual voltage corresponding to an exciting current flowing in the exciting coil 1 is sufficient for the current supply control of this embodiment.

According to a measurement carried out by the inventors of this application, in the case where an exciting coil of a reluctance type motor having an output of approximately 300 watts is controlled by a current supply control apparatus using the capacitor 5 of 0.1 μF which is similar to one defined in this embodiment, the exciting current 15 sharply responded to the change of standard voltage 14 even in a high chopper frequency corresponding to an exciting current section width of 0.5 μsec.

In this fashion, in accordance with the current supply control apparatus of this embodiment, the responsibility of exciting current to the standard voltage can be improved in a large inductance load.

Accordingly, the magnetic levitation of the rotor member in the magnetic bearing can be accomplished more accurately by executing the current supply control for the electromagnetic coil in the magnetic bearing as described above.

Above-described first embodiment can be variously modified.

For example, instead of the current supply control for the exciting coil in the magnetic bearing, the current supply control apparatus of the first embodiment can be applied to a current supply control for an armature (an exciting coil) of the motor.

Furthermore, the transistors 3a and 3b can be replaced by a high-speed switching element such as an IGBT etc., whereby the responsibility in the current supply control can be improved further.

Moreover, the standard voltage 14 shown in FIG. 2 can be replaced by a sine-wave standard voltage in order to make this embodiment apparatus applicable to an inverter-controlled device, whereby an induction machine capable of rotating at a high speed and being less subject to vibration can be obtained.

Though the back-flow preventing diode 6 is provided at the positive output terminal 2a side of the DC electric power source in the first embodiment, a diode 6a may be disposed at the negative output terminal 2b side of the DC electric power source as shown by a broken line in FIG. 1. In this case, however, a capacitor 5b is connected in parallel with the diode 6a.

Figure 3:
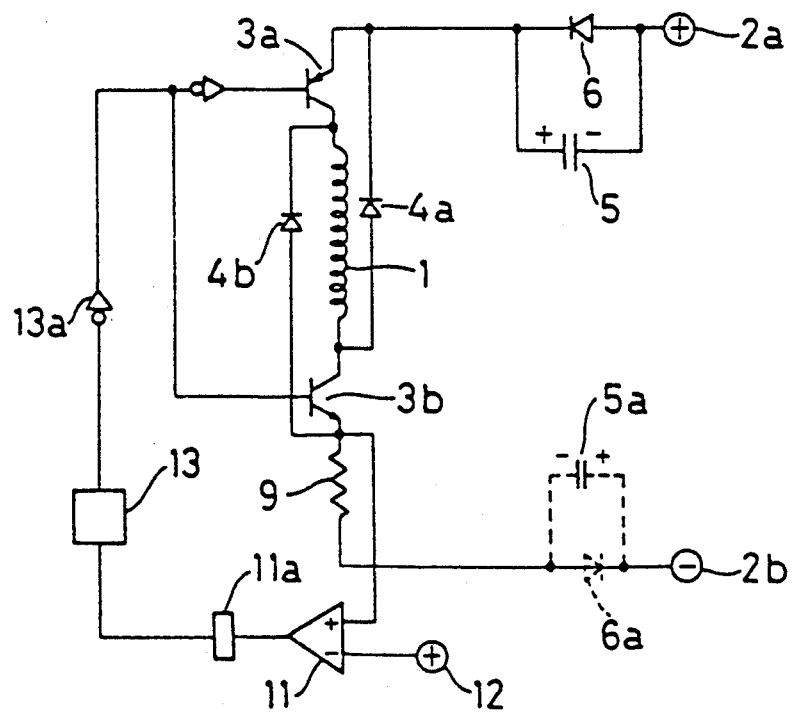
FIG. 3 is a circuit diagram showing a current supply control apparatus in accordance with a modified description of the preferred embodiment.

FIG. 3 shows another modification of the first embodiment. This modified embodiment is different from the first embodiment in that the chopper circuit is constituted differently. That is, a differential circuit 11a, a monostable circuit 13 and an inversion circuit 13a are employed instead of the amplification circuit 7 of FIG. 1.

When the exciting current exceeds the standard voltage 14 to change the output of the operational amplifier 11 from an L-level to an H-level, the differential circuit 11a generates a differential pulse. In response to this differential pulse, the monostable circuit 13 is activated to output a pulse having a predetermined time width.

The width of output pulse is determined in accordance with a capacitance of the capacitor 5. For example, it can be set to be equal to the time width of respective exciting current sections 15a~15d shown in FIG. 2. This output pulse is supplied through the inversion circuit 13a to the transistors 3a and 3b so as to turn off them.

Then, when the output pulse is extinguished, the transistors 3a and 3b will be turned on again. That is, the chopper function is executed in the same manner as the first embodiment. Also, as shown by a broken line in FIG. 3, the diode 6a may be interposed at the negative output terminal 2b side of the DC electric power source, and the capacitor 5b may be connected in parallel with the diode 6a.

Figure 4:
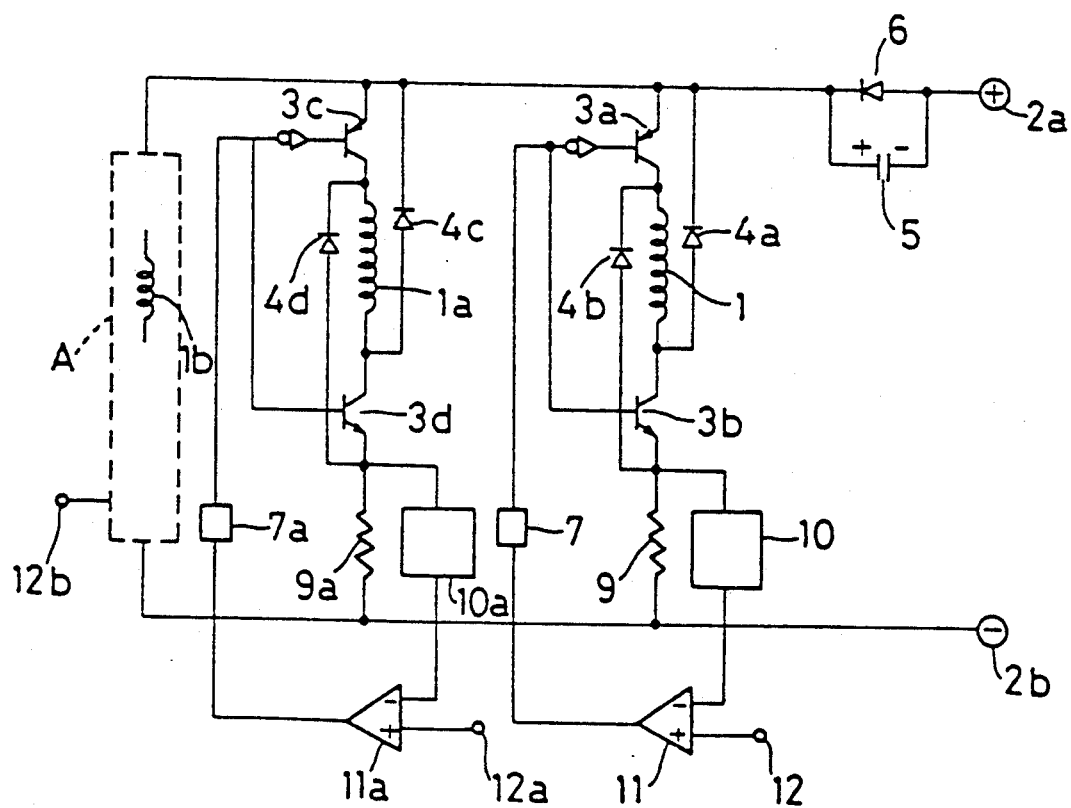
FIG. 4 is a circuit diagram showing a current supply control apparatus in accordance with a second embodiment of the present invention applied to a two-phase reluctance type motor.

Hereinafter, referring to FIGS. 4 and 5, a current supply control apparatus in accordance with a second embodiment of the present invention applied to a two-phase reluctance type motor will be explained.

Figure 5:
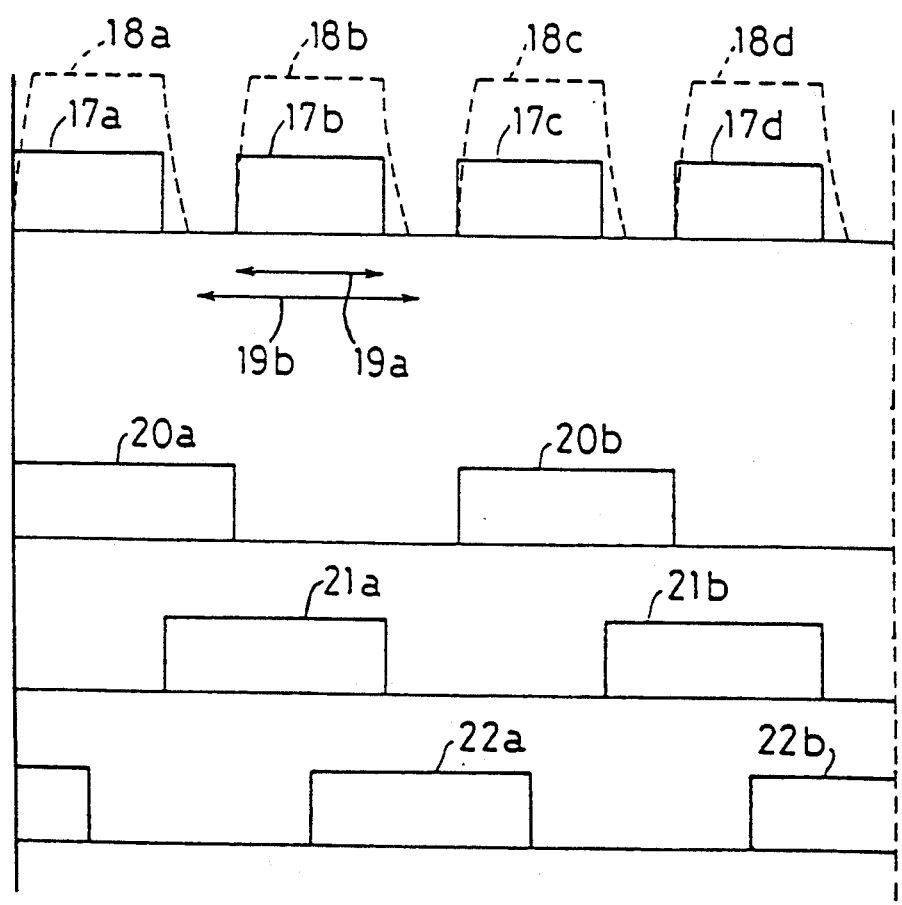
FIG. 5 is a graph showing position detecting signals applied to the apparatus of the second embodiment and the exciting current flowing through the exciting coil of the motor, together with position detecting signals applied to the apparatus of the modified example of the second embodiment.

The second embodiment apparatus serves as a current supply control unit for controlling current supplied to a first-phase and a second-phase armature coils (exciting coils) 1 and 1a in a two-phase reluctance type motor, as a first and a second inductance loads, in response to position detecting signals 17a~17d, ---, shown in FIG. 5.

A circuit constitution relating to respective exciting coils 1 and 1a in the current supply control apparatus is the same as the first embodiment. In FIG. 4, circuit components relating to the first-phase exciting coil 1 are suffixed by the same reference numeral as corresponding components of FIG. 1, whereas circuit components relating to the second phase exciting coil 1a are additionally suffixed by reference symbol a. Furthermore, two transistors relating to the second-phase exciting coil 1 are suffixed by the same reference numerals 3c and 3d, whereas two diodes are suffixed by reference numerals 4c and 4d.

A first standard voltage input terminal 12 is applied with rectangular-waveform position detecting signals 17a, 17c, - - - . Which are successively outputted at regular intervals of a predetermined electric angle from a position detecting device (not shown) in proportion to a rotational position of a rotor of the two-phase reluctance motor (not shown), whereas a second standard voltage input terminal 12a is applied with rectangular-waveform position detecting signals 17b, 17d, - - - . These position detecting signals 17a~17d, - - - have a width of the same electric angle.

In the current supply control apparatus constituted as above, when the position detecting signal 17a of an H-level is inputted to the first standard voltage input terminal 12, the chopper control is carried out in the same way as the first embodiment, and an exciting current corresponding to a value of the position detecting signal 17a flows in the first-phase exciting coil 1. When the H-level signal 17a is extinguished, the transistors 3a and 3b are turned off, causing the capacitor 5 to be charged by a current occurring due to the discharge of the magnetic energy stored in the first-phase exciting coil 1.

Subsequently, when the position detecting signal 12b is inputted to the second standard voltage input terminal 12a of the current supply control apparatus, an output of the operational amplifier 11a becomes an H-level, since an output of the absolute value circuit 10a is not larger than the magnitude of the signal 12a. Accordingly, the transistors 3c and 3d are turned on in response to an output from the amplification circuit 7a.

In this instance, both the charged voltage in the capacitor and the voltage of the DC electric power source are applied to the second-phase exciting coil 1a to cause the exciting current flowing in the exciting coil 1a to build up sharply. After that, the electric power source voltage is applied through the diode to the exciting coil 1a maintain a current supply to the exciting coil 1a.

Further, by virtue of the function performed by the chopper circuit including the operational amplifier 11a, the exciting current can be maintained at a magnitude proportional to the position detecting signal 17b. When the signal 17b is extinguished to deactivate the exciting coil 1a, the magnetic energy stored in the exciting coil 1a is supplied to the capacitor 5 through the diodes 4c and 4d to charge it up to a high voltage. Thus, the magnetic energy is converted into the electrostatic energy of the capacitor 5.

Moreover, due to this energy conversion, the exciting current flowing in the exciting coil 1 decreases steeply. Next, in response to an application of the position detecting signal 17c to the input terminal 12 of the current supply control apparatus, the exciting current flowing in the first exciting coil 1 builds up rapidly, is chopper-controlled and finally decreased steeply.

In FIG. 5, broken lines 18a~18d denote exciting currents; an arrow 19a denotes a section of an electric angle of 180 degrees; and an arrow 19b denotes a current supply section of, for example, 150 degrees.

As is described above, since both building-up and trailing-off of the exciting current are steep, torque reduction in the building-up period of the exciting current and counter torque generation in its trailing-edge period are fairly suppressed compared with a conventional reluctance type motor, and this enables a reluctance type motor equipped with an armature (an exciting coil) having a remarkably large inductance to be driven at a higher speed.

An above-described second embodiment can be modified variously.

For example, the second embodiment can be modified for application applied to a three-phase reluctance type motor having a first-, a second-, and a third-phase armature coils 1, 1a and 1b as a first, a second, and a third inductance load. In general, respective phase armature coils 1, 1a and 1b are formed from a plurality of armature coils to be supplied with the same-phase exciting current. The current supply control apparatus of this modified embodiment relates to the third-phase armature coil 1b and includes a circuit block A shown by a broken line in FIG. 4. The circuit block A includes the same circuit components as those relating to the first- and second-phase armature coils 1 and 1a.

An input terminal 12 of the current supply control circuit relating to the first-phase armature coil 1 is supplied with position detecting signals 20a, 20b, - - - each having a width of a 180-degree electric angle and spaced 180 degrees from each other (as shown in FIG. 5). In response to these position detecting signals, a current supply control of the first-phase armature coil 1 is carried out in the same manner as the second embodiment.

Similarly, in response to the position detecting signals 21a, 21b, - - - supplied to the input terminal 12a, a current supply control of the second-phase armature coil 1a is carried out, whereas, in response to the position detecting signals 22a, 22b, - - - supplied to the input terminal 12b, a current supply control of the third-phase armature coil 1b is carried out. Phases of the position detecting signals 21a, 21b, - - - are delayed by a 120-degree electric angle from those of the position detecting signals 20a, 20b, - - - respectively, whereas phases of the position detecting signals 22a, 22b, - - - are delayed by a 120-degree electric angle than those of the position detecting signals 21a, 21b, - - -respectively.

Accordingly, a phase of the exciting current flowing through the second-phase armature coil 1a is delayed by an electric angle of 120 degrees from a phase of the exciting current flowing through the first-phase armature coil 1, whereas a phase of the exciting current flowing through the third-phase armature coil 1b is delayed by an electric angle of 120 degrees from the phase of the exciting current flowing through the second-phase armature coil 1a. According to this modified embodiment, respective phase exciting current having a substantially rectangular waveform can be obtained. Thus, the motor can be driven at a high-speed.

The second embodiment can be modified for application to an n-phase DC motor including n-pieces (n=2, 3, - - - ) of armature coil as inductance loads. The n-pieces of the armature coil are respectively formed of a plurality of armatures being supplied with the same-phase current.

The current supply control apparatus of the above modified embodiment is supplied with position detecting signals of different phases being successively delayed by (360/n) degrees. Position detecting signals of different phases have the same 180-degree width and spaced 180 degrees from each other. The current supply control apparatus includes n pieces of back-flow preventing diode and n pieces of small capacitance capacitor, which are respectively corresponding to n pieces of inductance load. And, in response to application of respective phase position detecting signals, respective phase armature coils are successively supplied exciting current of electric angle width of 180 degrees with a (360/n)-degree phase difference.

Moreover, the second embodiment can be modified for application to an n-phase stepping motor. In this case, the same current supply control apparatus as the one applied to the above modification for the n-phase DC motor is used. The current supply control apparatus executes the current supply control on the basis of position detecting signals of different phases differing by a time width of 2T/n (T denotes a predetermined time width) from each other.

Hereinafter, with reference to FIG. 6, a current supply control apparatus in accordance with a third embodiment of the present invention, which is applied to a motor, will be explained.

This embodiment has basically the same constitution as the first embodiment (FIG. 1). The common circuit components are suffixed by the same reference numerals, and so their explanations are partly omitted here. This embodiment basically functions in the same way as the first embodiment. Thus, the explanation of its operation is partly omitted. FIG. 6 shows circuit components relating only to one phase of the motor.

Figure 6:
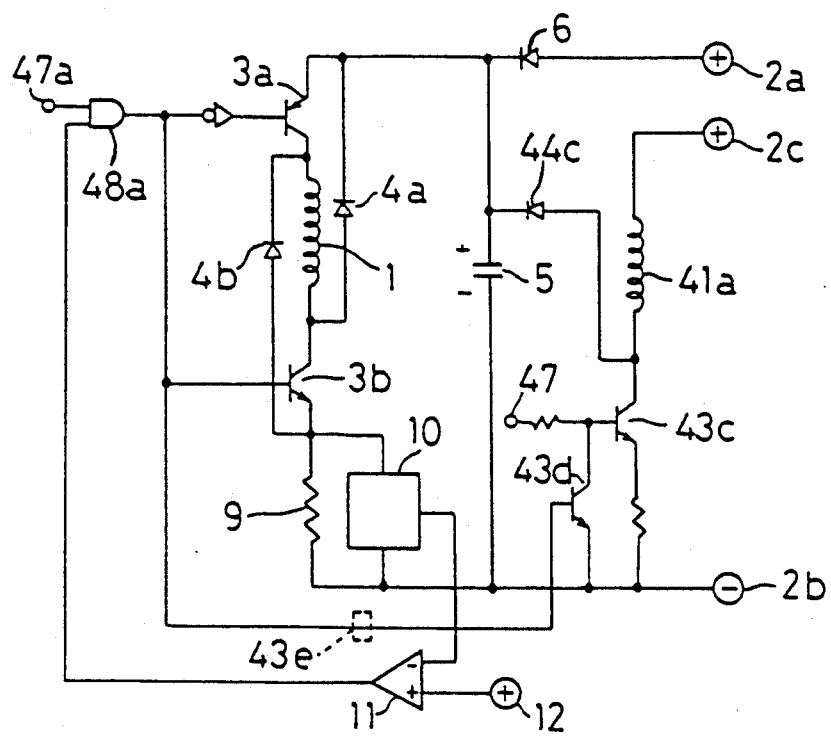
FIG. 6 is a circuit diagram showing a current supply control apparatus in accordance with a third embodiment of the present invention applied to a motor.

The current supply control apparatus shown in FIG. 6 comprises an AND circuit 48a having one input terminal being connected to the output terminal of the operational amplifier 11 instead of the amplification circuit 7 of FIG. 1. The AND circuit 48a has the other input terminal 47a to which a position detecting signal (not shown) representing the rotational position of the motor's rotor is supplied.

The standard voltage input terminal 12 is supplied with an exciting current control voltage (not shown) corresponding to the standard voltage 14 of the first embodiment. Further, the capacitor 5 is connected in series to the back-flow preventing diode 6.

Moreover, the current supply control apparatus includes an inductance 41a constituted by a ferrite magnetic core having a closed magnetic path and associated with a coil. This charging inductance 41a has its one end connected to an operational voltage terminal 2c provided, for example, for the divided voltage of the DC electric power source, whereas its other end being not only connected through the transistor 43c and a resistance to the negative output terminal 2b of the DC electric power source but also connected through the diode 44c to the capacitor 5.

A base of the transistor 43 is connected through a resistance to a control voltage input terminal 47, and also connected through the transistor 43d to an output terminal of an AND circuit 48a.

With above arrangement, if an H-level position detecting signal is applied to the AND circuit 48a in the condition where the exciting current control voltage 14 is applied to the standard voltage input terminal 12 and the gate of AND circuit 48a is opened in response to an H-level signal fed from the operational amplifier 11, the transistors 3a and 3b will be activated.

On the other hand, when the position detecting signal is extinguished, the transistors 3a and 3b are turned off. In response to the turning on and off of the transistors 3a and 3b, each component of the current supply control apparatus functions in the same fashion as the first embodiment to control the exciting coil 1. Thus, the exciting current flowing through the exciting coil 1 builds up rapidly and then is maintained at a value corresponding to the exciting current control voltage to decrease rapidly in the end.

During above current supply control operation, not only joule loss occurs due to a resistance of the exciting coil 1 but iron loss occurs in a magnetic core of the exciting coil 1. These energy losses tend to increase as the inductance of the exciting coil 1 increases and also as the chopper frequency increases, thereby sometimes ending up with a loss of approximately 30%.

If the energy loss increases, an electrostatic energy stored in the capacitor 5 decreases. Furthermore, a conversion loss increases when the electrostatic energy is converted into the magnetic energy. In this case, the exciting current 15 does not respond quickly to the exciting current control voltage 14 applied to the standard voltage input terminal 12. This embodiment can solve such a disadvantage by utilizing function of the charging inductance 41a.

More particularly, when the control voltage input terminal 47 is applied with a positive voltage to turn on the transistor 43c, the charging inductance 41a is applied with an operational voltage from the operational voltage terminal 2c. Thus, a magnetic energy is stored in the charging inductance 41a. In such a condition, if an H-level output is sent out from the AND circuit 48a, the exciting coil 1 is supplied with exciting current and the transistor 43d is turned on, thereby causing simultaneous deactivation of the transistor 43c.

In this instance, as is explained with reference to FIG. 1, the exciting coil 1 is not only applied with the voltage of the DC electric power source but also applied with the voltage charged in the capacitor 5 by virtue of the magnetic energy stored in the exciting coil 1.

In addition to this, in this embodiment, the magnetic energy stored in the inductance 41a is supplied through the diode 4c to the capacitor 5 in an initial stage of the current supply period to have the capacitor 5 charged with polarities shown in the drawing. As a result, the magnetic energy is converted into the electrostatic energy. Accordingly, a charge voltage of the capacitor 5, which has already been charged with the magnetic energy stored in the exciting coil 1, will further be increased. Consequently, the exciting current flowing through the exciting coil 1 will be increased sharply.

Next, when an output of the AND circuit 48a is changed from an H-level to an L-level, the exciting coil 1 is deactivated to cause the capacitor 5 to be charged with the magnetic energy stored in the exciting coil 1. At the same time, the transistor 43d is turned off, whereas the transistor 43c is turned on to let current flow in the inductance 41a to store a magnetic energy therein.

As is understood from the above explanation, energy lost in the form of copper loss and iron loss is compensated from the charging inductance 41a through the diode 44c. Accordingly, both the building-up and trailing-off of exciting current become steep. That is, the responsibility in the current supply control can be improved.

Further, it is desirable for the charging inductance 41a to be supplied with a current having a magnitude determined based on the exciting current value. For this reason, an operational voltage proportional to the voltage applied to the standard voltage input terminal 12 is applied through the terminal 2c to the charging inductance 41a. Otherwise, a voltage proportional to the exciting current control voltage 14 is applied from the terminal 47 to the base of the transistor 43c that operates in an active region.

This third embodiment can be variously modified.

For example, though the capacitor 5 in the third embodiment is charged with the magnetic energy stored in the charging inductance 41a at the timing the exciting current flowing the exciting coil 1 builds up, it is also preferable to charge the capacitor 5 at the time point at which the exciting current trails off. In this case, as shown by a broken line in FIG. 6, an inversion circuit 43e is inserted.

Figure 7:
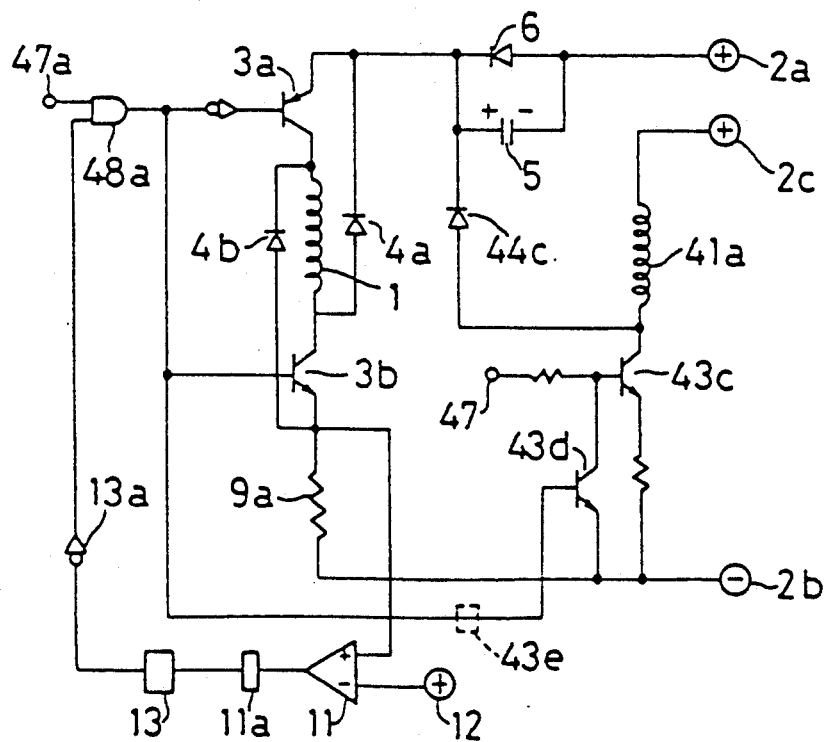
FIG. 7 is a circuit diagram showing a current supply control apparatus in accordance with a modified example of the third embodiment.

Furthermore, the third embodiment can be modified as shown in FIG. 7. This modified embodiment corresponds to the modified embodiment of the first embodiment (FIG. 3), and basically operates in the same manner as the third embodiment and the modified embodiment of the first embodiment (FIG. 3).

When the charging inductance 41a is deactivated, the capacitor 5 is charged with the discharge of magnetic energy stored in the inductance 41a to have polarities shown in the drawing, and a voltage equal to a sum of the DC electric power source voltage and the capacitor charged voltage is applied to the exciting coil 1 to sharply build up the exciting current. Subsequently, the exciting current decreases steeply.

Furthermore, the third embodiment can be modified in the same manner as other modifications explained in conjunction with the first embodiment.

Hereinafter, referring now to FIG. 8, a current supply control apparatus in accordance with a fourth embodiment of the present invention applied to a three-phase full-wave reluctance type motor will be explained.

Figure 8:
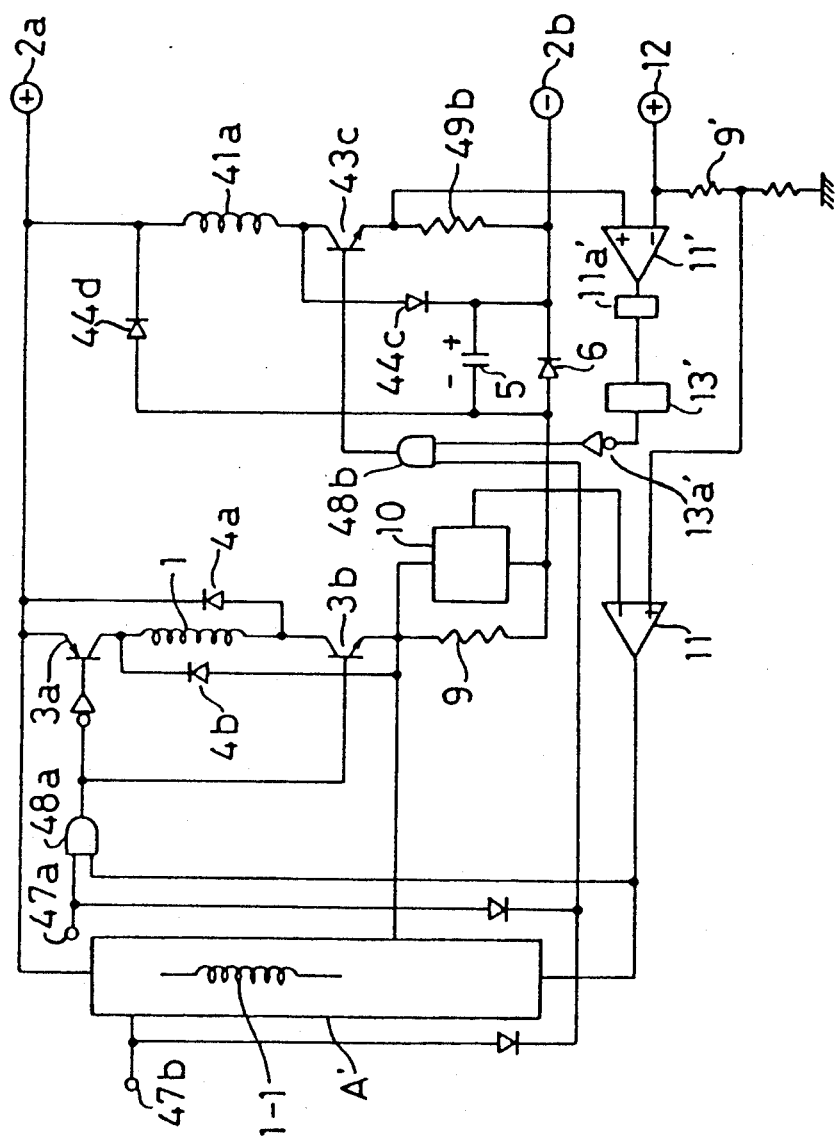
FIG. 8 is a circuit diagram showing a current supply control apparatus in accordance with a fourth embodiment of the present invention applied to a three-phase full-wave reluctance type motor.

In FIG. 8, a reference numeral 1 denotes a first-phase exciting coil for a motor, whereas a reference numeral 1—1 denotes a second-phase exciting coil. The third-phase exciting coil is omitted here. The circuit components corresponding to the first-phase exciting coil 1 are explained in detail, whereas the circuit components corresponding to the second-phase exciting coil 1—1 are simplified by showing them as a block A' in the drawing, and the circuit components relating to the third-phase exciting coil is omitted.

The current control apparatus is constituted in such a manner that the first-, the second-, and the third-phase exciting coils provided as inductance loads are successively activated in a half-wave current supply mode in response to rectangular-waveform position detecting signals supplied to three input terminals (two of them are suffixed by reference numerals 47a, 47b). The position detecting signals supplied to the input terminal 47a are suffixed by reference numerals 117a, 117b, and the position detecting signal supplied to the input terminal 47b is suffixed by a reference numeral 118a in FIG. 9.

These position detecting signals 117a, 117b, - - - have the same width of a 120-degree electric angle and also have a 360-degree phase difference with each other. The position detecting signals 118a, - - - have a 180-degree phase difference with respect to the position detecting signals 117a, 117b, - - - .

Figure 9:
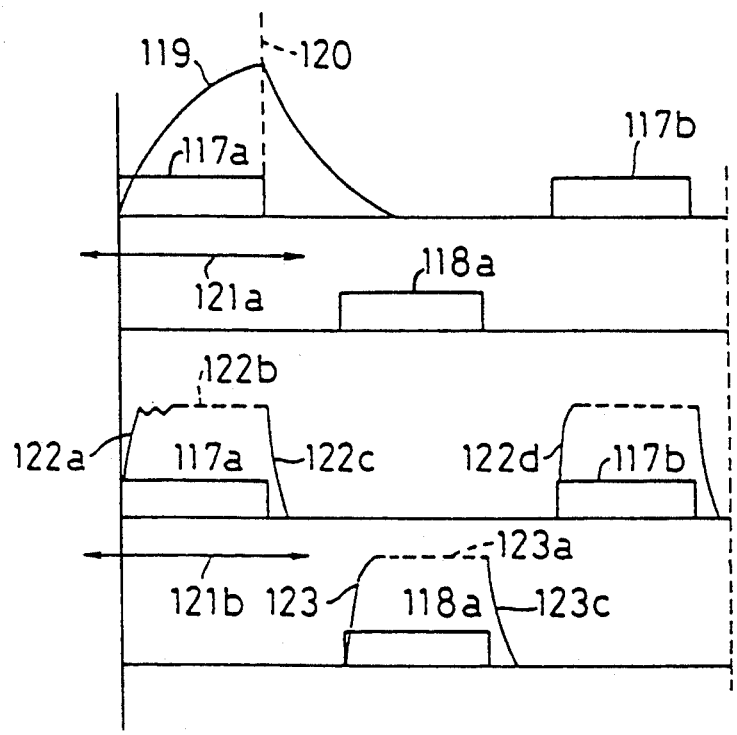
FIG. 9 is a graph showing position detecting signals applied to the apparatus of FIG. 8 and an exciting current of the motor, together with an exciting current of the conventional motor.

In a conventional reluctance type motor, when the current supply to the exciting coil 1 is initiated in response to an application of the position detecting signal 117a, the exciting current builds up slowly along a curve 119 shown in FIG. 9 because of a large inductance of the exciting coil 1, thereby causing the motor output torque to decreases.

Furthermore, when the current supply is stopped, the exciting current decreases slowly because of the magnetic energy stored in the exciting coil 1. Accordingly, the exciting current flows even at outside of the positive torque generating section 121a of 180 degrees, thereby causing a counter torque to occur.

When the motor is driven at a high speed, a width of the position detecting signal 117a decreases, whereas a width of torque reduction generating section or a width of counter torque generating section will not decrease, and thus the current supply section width decreases as a whole, thereby making a high-speed driving operation difficult.

In order to solve above problem, this embodiment is constituted in the same manner as the third embodiment. That is, at the time point at which the current supply to respective exciting coil is stopped or started, the capacitor 5 is charged or discharged to sharply build up the exciting current or to steeply decrease it. With this arrangement, the current supply to exciting coil of each phase can be carried out during the position detecting signal width.

Furthermore, the charging inductance 41a is activated during a width corresponding to the position detecting signal to store the magnetic energy. Therefore, the copper loss and the iron loss occurring in the exciting coil at the time point at which the current supply to the exciting coil is stopped or started are compensated by the magnetic energy stored in the charging inductance 41a. Thus, both the building-up and the trailing-off of the exciting current become so sharp that the motor can be driven at a high speed of 100,000 rpm with a large output torque.

Hereinafter, an operation of the current supply control apparatus of FIG. 8 will be explained.

An AND circuit 48a, transistors 3a, 3b, diodes 4a, 4b, a resistance 9, and an absolute value circuit 10 respectively function in the same manner as the third embodiment shown in FIG. 6. A positive input terminal of the operational amplifier 11 is applied with a voltage obtained by dividing the standard voltage 14 (FIG. 2) of the standard voltage input terminal 12 by the resistance 9'. Consequently, the exciting current flowing through the first-phase exciting coil 1 is chopper-controlled to a value corresponding to the standard voltage 14 as shown by a curve 122b in FIG. 9.

Moreover, the operational amplifier 11' and its peripheral circuit components function in the same manner as the corresponding circuit components of the third embodiment. One input terminal of the AND circuit 48b is supplied with a position detecting signal 117a (FIG. 9) of an H-level, which is to be inputted to the AND circuit 48a. Therefore, during a period of the position detecting signal 117a, the charging inductance 41a is supplied with a current having a value restricted by the standard voltage 14. During this period, a discharged current of the capacitor 5 is supplied through the diodes 44c and 44d to the charging inductance 41a when the transistor 43c is turned off by being chopper-controlled.

When the position detecting signal 117a is changed from an H-level to an L-level, the transistors 3a and 3b are turned off. In this instance, a discharging current derived from the magnetic energy stored in the exciting coil 1 charges the capacitor 5 to polarities shown in the drawing through the diodes 4a, 4b, and the DC electric power sources 2a and 2b.

At the same time, the capacitor 5 is charged with the magnetic energy stored in the charging inductance 41 a through the diodes 44c and 44d. Accordingly, the capacitor 5 can be charged up to a high voltage.

Furthermore, in response to the application of H-level position detecting signals 118a, - - - to the input terminal 47b of the current supply control apparatus, transistors connected to both ends of the second-phase exciting coil 1—1 are turned on to initiate the exciting current supply. In this case, a voltage corresponding to a sum of the charged voltage of capacitor and the voltage of DC electric power source is applied to the exciting coil 1—1, and the exciting current builds up sharply as shown by a curve 123 of FIG. 9.

Subsequently, by virtue of a chopper function of the operational amplifier 11 etc., the exciting current is chopper-controlled as shown by a broken line 123a. Then, when the position detecting signal 118a turns from an H-level to an L-level, both the transistor connected to the exciting coil and the transistor 43c connected to the charging inductance 41a are turned off simultaneously to cause exciting current to decrease steeply as shown by a curve 123c.

In FIG. 9, the curve 122d shows the exciting current flowing in the first-phase exciting coil 1 in response to the position detecting signal 117b supplied to the input terminal 47a.

As shown in FIG. 9, since each width of the exciting current curve 122a~122c is in a section 121b of a 180-degree electric angle, no counter torque is generated.

Furthermore, since the exciting current has substantially a rectangular-waveform, no torque reduction is generated.

Further, in order to make the building-up and the trailing-off of the exciting current steep, the capacitance of the capacitor 5 is depending on the value of a current flowing in the exciting coil and an inductance value of the exciting coil. Further, an inductance value of the charging inductance 41a and the value of a current flowing in the charging inductance 41a are determined based on the same criterion.

Still further, it is possible to drive the motor at a constant speed by varying the standard voltage 14 to rotational speed of the motor.

Figure 10:
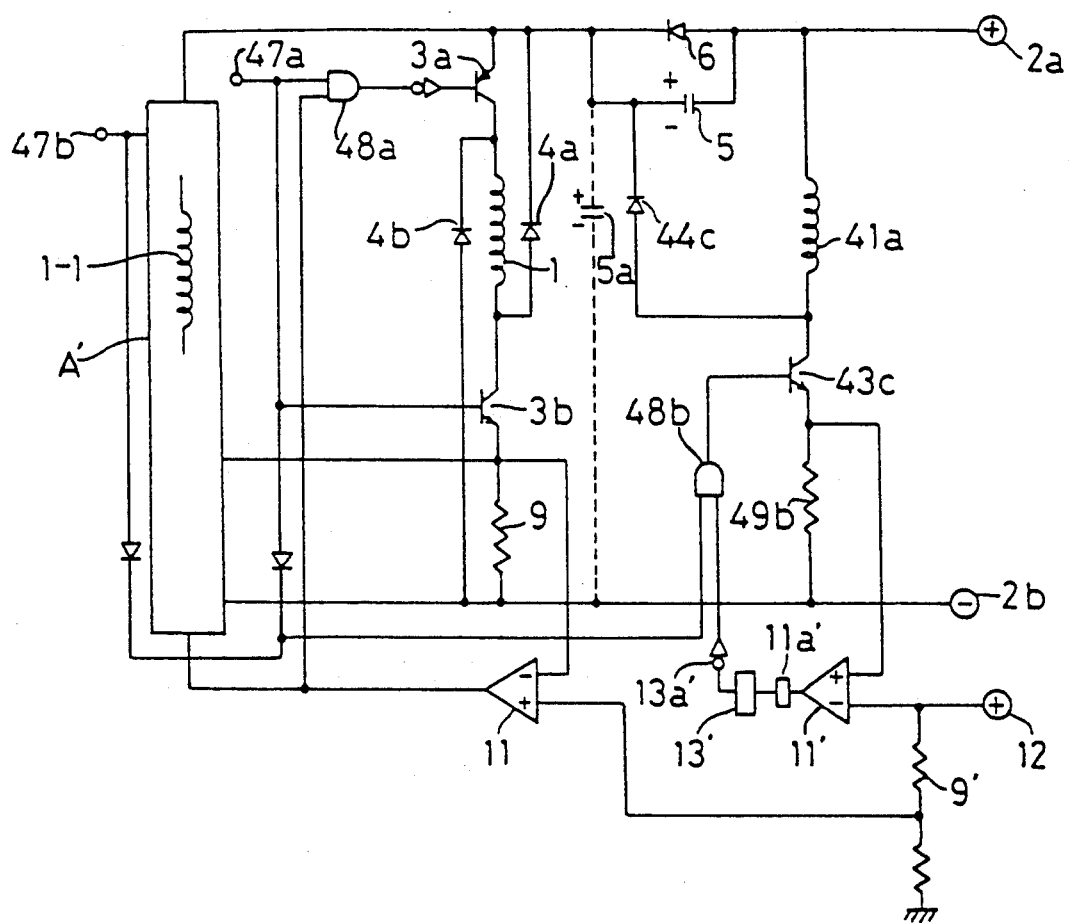
FIG. 10 is a circuit diagram showing a current supply control apparatus in accordance with a modified example of the fourth embodiment.

FIG. 10 shows a modified embodiment of the current supply control apparatus of the fourth embodiment (FIG. 8).

This modified embodiment differs from the fourth embodiment in that an output of the operational amplifier 11 is fed to only one (for example, the transistor 3a) of two transistors connected to both ends of each phase exciting coil, and also in that the capacitor 5 is connected in parallel with a back-flow preventing diode 6 interposed between the exciting coil and the DC electric power source.

In the modified embodiment of FIG. 10, when the position detecting signal 117a is supplied to the input terminal 47a, the transistors 3a and 3b are turned on to activate the first-phase exciting coil 1. On the other hand, if the exciting current increases and the voltage applied between both ends of the resistance 9 exceeds the standard voltage 14 of the positive input terminal of the operational amplifier 11, a gate of the AND circuit 8a is closed to turn off the transistor 3a.

With this arrangement, the magnetic energy stored in the exciting coil 1 is discharged through the transistor 3b, the resistance 9 and the diode 4b, and the exciting current is decreased. When the exciting current decreases down to a set value, an output of the operational amplifier 11 returns to a H-level due to a hysteresis characteristic of the operational amplifier 11, whereby the transistor 3a is turned on again to increase the exciting current.

Owing to such a chopper function, the exciting current can be maintained at a set value. When the position detecting signal 117a is extinguished, the transistors 3a and 3b are turned off together.

The magnetic energy stored in the exciting coil 1 charges the capacitor 5 to polarities shown in the drawing though the diodes 4a and 4b. Thus, the magnetic energy decreases rapidly, and the exciting current trails off steeply.

Since a gate of the AND circuit 48b is opened or closed in response to the position detecting signal 117a, the control of the current supply to the charging inductance 41a is carried out corresponding to a duration of the position detecting signal 117a.

And, under the control of chopper circuit consisting of the AND circuit 48b, the resistance 49b, the operational amplifier 11' etc., the charging inductance 41a is supplied with a current corresponding to the standard voltage 14.

Then, if the position detecting signal 117a is extinguished to turn off the transistor 43c, the magnetic energy stored in the charging inductance 41a charges the capacitor 5 up to a high voltage through the diode 44c. Accordingly, the exciting current flowing in the exciting coil 1 decreases steeply.

Similar current supply control is carried out with respect to the second-phase and third-phase exciting coils.

The fourth embodiment can be further modified variously. For example, instead of the capacitor 5, a capacitor 5a can be provided as shown by a broken line in FIG. 10. Moreover, the fourth embodiment can be modified so as to be applied to a three-phase brushless motor having a magnet rotor. In this case, since the armature coil has a small inductance, the motor can be driven at a further high-speed.

Hereinafter, with reference to FIG. 11, a current supply control apparatus in accordance with a fifth embodiment of the present invention applied to a six-phase half-wave stepping motor will be explained.

A conventional large-size, high-output torque, stepping motor a large inductance armature coil and a long stepping time, and thus it was not possible for such a motor to promptly move the load connected to the motor. Especially, this kind of problem is conspicuous in a reluctance type stepping motor, though it can provide a large output torque. This embodiment aims to solve such a problem.

Figure 11:
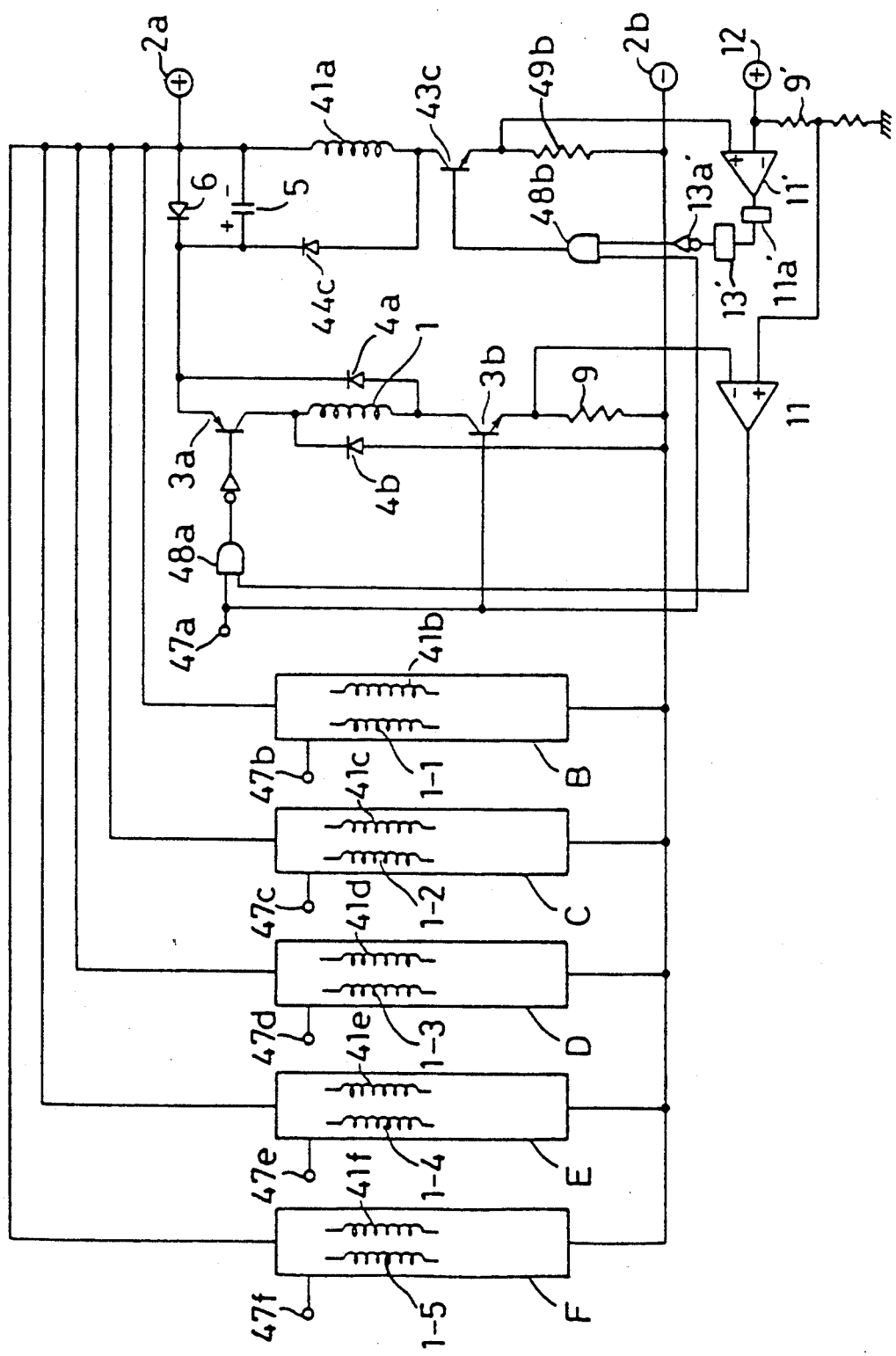
FIG. 11 is a circuit diagram showing a current supply control apparatus in accordance with a fifth embodiment of the present invention applied to a six-phase half-wave stepping motor.

In FIG. 11, a current supply control circuit component relating to the first-phase armature coil (inductance load) 1 and the charging inductance 41a is illustrated in detail, and current supply control circuit components relating to the second- to sixth-phase armature coils 1-1~1-5 and the charging inductances 41b~41f are briefly illustrated by merely showing blocks B~F.

Figure 12:
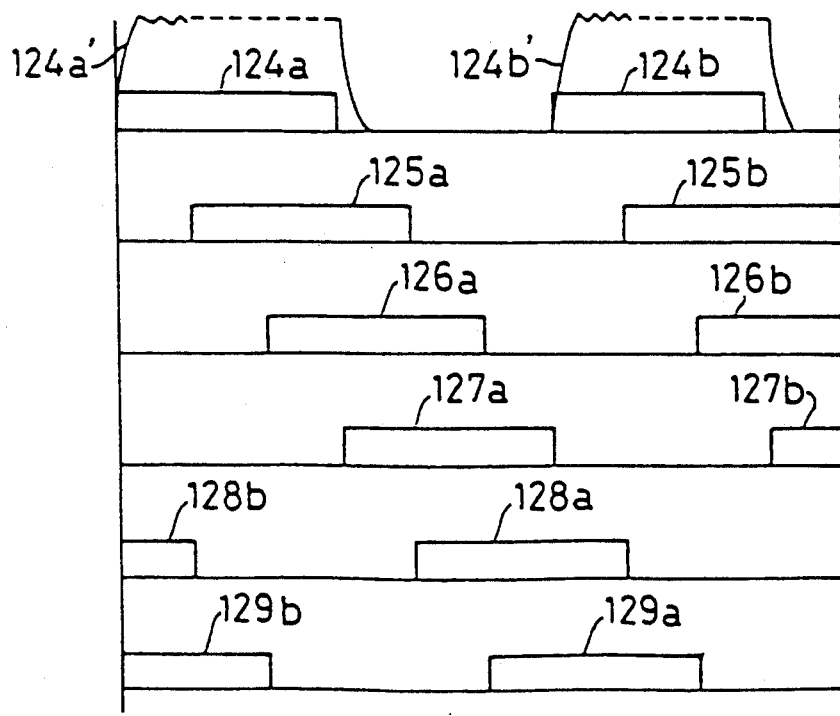
FIG. 12 is a graph showing pulse signals applied to the apparatus of FIG. 11 and an exciting current of the motor.

Input terminals 47a~47f of the first- to sixth-phase circuit components applied with first- to sixth-phase rectangular-waveform pulse signals 124a, 124b, - - -, 125a, 125b, - - -, 126a, 126b, - - - 127a, 127b, - - - 128a, 128b, - - - 129a, 129b, - - - (FIG. 12). The pulses belonging to the same phase have a mutual phase difference of a 180-degree electric angle, and, respective phase pulses are spaced by 60 degrees from each other.

When the pulse signal 124a is inputted to the input terminal 47a, an exciting current 124a' flows in the first armature coil 1. In the same manner as above-described various embodiments, the exciting current builds up sharply. Then, when a next pulse signal 124b is supplied to the input terminal 47a, a high voltage corresponding to a sum of the charged voltage in the capacitor 5 and the voltage of the DC electric power source is applied to the armature coil 1, causing the exciting current 124b' to builds up sharply.

When the pulse signal 124b is extinguished to deactivate the armature coil 1, the magnetic energies stored in the armature coil 1 and the charging inductance 41a are converted into the electrostatic energy in the capacitor 5 to charge the capacitor 5 with a high voltage. Thus, the exciting current 124b' decreases rapidly. In this manner, regardless of the value of inductance load, the current supply to the first-phase armature coil can be executed during a time width corresponding to a pulse signal width even if the motor rotational speed is increased.

In the same way, the current supply to the second- to sixth-phase armature coils can be executed during time widths corresponding to respective pulse signal widths. Thus, the stepping operations in the motor can be executed at a high speed.

What is claimed is:

1. A current supply control apparatus for an inductance load comprising:
   first and second switching elements interposed between a DC electric power source and the inductance load;
   first and second diodes inversely connected to respective ones of said first and second switching elements and the inductance load;
   current detecting means for generating a detecting voltage representing a current flowing in the inductance load;
   a back-flow preventing diode connected in a forward direction with respect to the DC electric power source on the DC electric power source side;
   a capacitor connected to said back-flow preventing diode; and
   a chopper circuit for comparing said detecting voltage from said current detecting means with a standard voltage variably set in a voltage waveform for turning on or off said first and second switching elements depending on the result of the comparison, said chopper circuit including:

an absolute value circuit, connected to said current detecting means, for detecting a voltage drop in said current detecting means;
when the detecting voltage exceeds the standard voltage, said first and second switching elements are turned off, during the turning-off period of said switching elements, a magnetic energy stored in the inductance load is prevented from being returned to the DC electric power source by said back-flow preventing diode, the magnetic energy is supplied to said capacitor through said first and second diodes to charge said capacitor, thereby causing a current flowing in the inductance load to be quickly reduced after said switching elements have been turned off, and when the detecting voltage decreases to a predetermined value, said first and second switching elements are turned on to cause a high voltage equal to a sum of a voltage charged in said capacitor and a voltage of the DC electric power source to be applied to the inductance load so that a current flowing in the inductance load can be increased sharply.

2. A current supply control apparatus in accordance with claim 1, further comprising:
   a charging inductance;
   a third switching element interposed between said back-flow preventing diode and said charging inductance; and
   a third diode interposed between said charging inductance and said capacitor, wherein, a magnetic energy stored in said charging inductance is supplied to said capacitor through said third diode when said third switching element is turned off.

3. A current supply control apparatus for n-sets of inductance loads, comprising:
   n sets of semiconductor switching elements respectively connected to both ends of the n sets of inductance loads, n being a positive integer;
   a DC electric power source for supplying exciting current to the n sets of inductance loads through said n sets of semiconductor switching elements;
   inversely connected diodes inversely connected to connecting units each including respective ones of said n sets of semiconductor switching elements and respective n-sets of inductance loads;
   a current detecting circuit for detecting an exciting current flowing in said n sets of inductance loads to obtain n sets of detecting voltage;
   back-flow preventing diodes respectively connected in a forward direction with respect to said DC electric power source on a DC electric power source side;
   n capacitors having a small capacitance and connected in parallel with said back-flow preventing diodes;
   n sets of rectangular-waveform signal rows having a predetermined width and a predetermined phase difference; and
   circuit means including a chopper circuit including an absolute value circuit connected to said current detecting circuit for detecting a voltage drop in said current detection circuit, said circuit means being formed such that said n sets of semiconductor switching elements are turned on to activate the n sets of inductance loads in response to said n sets of rectangular-waveform signal rows, and a corresponding one of said n sets of semiconductor switching elements is turned off when each of said n sets of detecting voltage exceeds a set value, a magnetic energy stored in the n sets of inductance loads is prevented from being returned to said DC electric power source by an action of said back-flow preventing diode, and the magnetic energy is converted into electrostatic energy of said n capacitors through said inversely connected diodes so that a current flowing in said inductance load is quickly reduced and when the detecting voltage has decreased to a predetermined value, said corresponding one of said semiconductor switching elements is turned on to cause a high voltage equal to a sum of a voltage charged in said n capacitors and a voltage of said DC electric power source to be applied to the n sets of inductance loads so that current flowing in the n sets of inductance loads can be increased sharply.

4. A current supply control apparatus for inductance loads comprising:
first and second inductance loads;
first and second sets of semiconductor switching elements respectively connected to both ends of said first and second inductance loads;
a DC electric power source for supplying exciting current to said first and second inductance loads through said first and second sets of semiconductor switching elements;
inversely connected diodes, inversely connected to respective serial connecting units including respective semiconductor switching elements and respective inductance loads;
a first current detecting circuit for detecting exciting current flowing in said first and second inductance loads to obtain a first detecting voltage;
back-flow preventing diodes respectively connected in a forward direction with respect to said DC electric power source on a DC electric power source side;
capacitors connected in parallel with said back-flow preventing diodes;
a third set of semiconductor switching elements;
a charging inductance supplied with current through said third set of semiconductor switching elements from said DC electric power source;
a second current detecting circuit for detecting exciting current flowing in said charging inductance to obtain a second detecting voltage;
a current supply control circuit, connected to said first, second and third sets of semiconductor switching elements, responding to odd signals included in a row of rectangular-waveform signals each having a predetermined time width and being spaced from each other with a predetermined phase difference to turn on said first set of semiconductor switching elements during said predetermined time width to activate said first inductance load, responding to even signals included in said row of rectangular-waveform signals to turn on said second set of semiconductor switching elements during said predetermined time width to activate said second inductance load, and further responding to all signals included in said row of rectangular-waveform signals to turn on said third set of semiconductor switching elements during said predetermined time width to activate said inductance loads;

an electric circuit for discharging magnetic energy stored in said charging inductance to charge said capacitors through said inversely connected diodes to a joint point of said charging inductance and said third semiconductor switching element, when said third semiconductor switching element is turned off;
a first chopper circuit for comparing the first detecting voltage with a standard voltage commanding an exciting current flowing in said first and second inductance loads, as well as for controlling the on and off of said first and second sets of semiconductor switching elements depending on the result of such comparison so that the exciting current flowing in said first and second inductance loads can be maintained at a value corresponding to said standard voltage; and
a second chopper circuit for comparing the second detecting voltage with said standard voltage, and controlling the on and off of said third set of semiconductor switching elements depending on the result of the comparison so that the exciting current flowing in said charging inductance can be maintained at a value corresponding to said standard voltage, said electric circuit being formed such that, when one of said first and second inductance loads is deactivated in response to extinction of respective signals of said row of rectangular-waveform signals, magnetic energy stored in said one of said first and second inductance loads and said charging inductance being prevented from returning to said DC electric power source by said back-flow preventing diode, is converted through said inversely connected diodes into an electrostatic energy of said capacitor to charge said capacitor with a high voltage, thereby quickly reducing the exciting current flowing in said inductance loads, when the current supply control to the other one of said first and second inductance loads is initiated in response to an application of a next signal of said row of rectangular waveform signals, the exciting current of said other one of said first and second inductance loads is sharply increased by the charged voltage of said capacitors.

5. A current supply control apparatus for inductance loads comprising:
a plurality of inductance loads;
plural sets of semiconductor switching elements respectively connected to both ends of said plurality of inductance loads;
a DC electric power source for supplying exciting current to said plurality of inductance loads through said plural sets of semiconductor switching elements;
inversely connected diodes inversely connected to respective serial connecting units including respective ones of said plural sets of semiconductor switching elements and respective inductance loads;
a first current detecting circuit for detecting exciting current flowing in said plurality of inductance loads to obtain a first group of detecting voltages;
a plurality of back-flow preventing diodes respectively connected in a forward direction with respect to said DC electric power source on a DC electric power source side;
a plurality of capacitors connected in parallel with said plurality of back-flow preventing diodes;

a plurality of charging inductances supplied with current from said DC electric power source through said plural sets of semiconductor switching elements;

a plurality of diodes inversely connected to respective joint points of said plurality of charging inductances;

a second current detecting circuit for detecting exciting current flowing in said plurality of charging inductances to obtain a second group of detecting voltages;

a first chopper circuit for responding to said second group of detecting voltages to supply a current proportional to a standard voltage commanding an exciting current of said plurality of inductance loads to a corresponding one of said plurality of charging inductances;

a first current supply control circuit, responding to a plurality of signal rows consisting of plural signals each having a predetermined time width and being generated at predetermined intervals, said signal rows being spaced from each other with a predetermined phase difference, and turning on said plural sets of semiconductor switching elements during said predetermined time width to activate said plurality of inductance loads;

a second current supply control circuit, responding to said plurality of signal rows to turn on said plural sets of semiconductor switching elements only during said predetermined time width to activate said plurality of charging inductances;

an electric circuit for discharging a magnetic energy stored in said plurality of charging inductances to charge a corresponding one of said plurality of capacitors through a respective one of said plurality of diodes and a corresponding one of said plural sets of semiconductor switching elements, when respective ones of said plural semiconductor switching elements are turned off; and a second chopper circuit for comparing the first group of detecting voltages with said standard voltage to control said plural sets of semiconductor switching elements to be ON and OFF depending on the result of the comparison so that the exciting current flowing in said plurality of inductance loads can be maintained at a value corresponding to said standard voltage, said electric circuit formed such that, when one of said plurality of inductance loads is deactivated in response to extinctions of respective signals of said signal rows, magnetic energy stored in one of said plurality of inductance loads and a corresponding charging inductance are prevented from returning to said DC electric power source by the action of a corresponding one of said plurality of back-flow preventing diodes, is converted through a respective one of said inversely connected diodes into electrostatic energy of a corresponding one of said plurality of capacitors to charge said corresponding one of said plurality of capacitors with a high voltage and to quickly reduce the exciting current flowing in said one of said plurality of inductance loads, and when the current supply control to another one of said plurality of inductance loads is initiated in response to an application of a next signal of said plurality of signal rows, the exciting current of said another one of said plurality of inductance loads is sharply increased by the charged voltage of said corresponding one of said plurality of capacitors.

* * * * *